US006993764B2

(12) United States Patent
Petrini et al.

(10) Patent No.: US 6,993,764 B2
(45) Date of Patent: Jan. 31, 2006

(54) BUFFERED COSCHEDULING FOR PARALLEL PROGRAMMING AND ENHANCED FAULT TOLERANCE

(75) Inventors: Fabrizio Petrini, Los Alamos, NM (US); Wu-chun Feng, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 729 days.

(21) Appl. No.: 09/895,570

(22) Filed: Jun. 28, 2001

(65) Prior Publication Data

US 2002/0083116 A1  Jun. 27, 2002

Related U.S. Application Data

(60) Provisional application No. 60/215,416, filed on Jun. 30, 2000.

(51) Int. Cl.
*G06F 7/00* (2006.01)
(52) U.S. Cl. .................... 718/102; 712/10; 712/11; 712/16; 712/18; 712/19; 713/502; 713/600
(58) Field of Classification Search ............. 714/15; 718/108, 102; 712/29, 10–19; 713/502, 713/600
See application file for complete search history.

(56) References Cited

U.S. PATENT DOCUMENTS

| | | | | |
|---|---|---|---|---|
| 5,590,284 | A | * | 12/1996 | Crosetto ................. 712/29 |
| 5,600,843 | A | * | 2/1997 | Kato et al. .............. 712/19 |
| 5,781,775 | A | * | 7/1998 | Ueno ..................... 718/102 |
| 5,938,775 | A | * | 8/1999 | Damani et al. ........... 714/15 |
| 6,061,711 | A | * | 5/2000 | Song et al. .............. 718/108 |
| 6,173,306 | B1 | * | 1/2001 | Raz et al. ............... 718/102 |

OTHER PUBLICATIONS

Diefendorff, "Compaq Chooses SMT for Alpha: simultaneous Multithreading Exploits Instruction—and Thread-Level Parallelism," Microprocessor Report, vol. 13, No. 16, Dec. 1999, pp. 1-7.
Keckler, et al., "Concurrent Event Handling through Multithreading," IEEECS, vol. 48, No. 9, Sep. 1999, pp. 903-916.
Tseng et al., " All-to-All Personalized Communication in a Wormhole-Routed Torus," IEEECS, vol. 7, No. 5, May 1996, pp. 490-505.
Arpaci-Dusseau, et al., "Scheduling with Implicit Information in Distributed Systems," Jun. 1998, pp. 1-11.
Eggers, et al., "Simultaneous Multithreading: A Platform for Next-Generation Processors," IEEE Micro, Sep./Oct. 1997, pp. 12-19.

* cited by examiner

*Primary Examiner*—W. Thomson
*Assistant Examiner*—Qing-Yuan Wu
(74) *Attorney, Agent, or Firm*—Mark N. Fitzgerald; Ray G. Wilson (57) ABSTRACT

A computer implemented method schedules processor jobs on a network of parallel machine processors or distributed system processors. Control information communications generated by each process performed by each processor during a defined time interval is accumulated in buffers, where adjacent time intervals are separated by strobe intervals for a global exchange of control information. A global exchange of the control information communications at the end of each defined time interval is performed during an intervening strobe interval so that each processor is informed by all of the other processors of the number of incoming jobs to be received by each processor in a subsequent time interval. The buffered coscheduling method of this invention also enhances the fault tolerance of a network of parallel machine processors or distributed system processors

5 Claims, 11 Drawing Sheets

FIGURE 7 - Job Scheduler

FIGURE 8 - LOCAL SCHEDULER FOR BCS

FIGURE 10

BUFFERED COSCHEDULING FOR PARALLEL PROGRAMMING AND ENHANCED FAULT TOLERANCE

RELATED APPLICATIONS

This application claims priority of provisional patent application Ser. No. 60/215,416 filed Jun. 30, 2000, incorporated herein by reference for all purposes.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to parallel computing, and, more particularly to scheduling parallel jobs on a parallel processor machine or in distributed systems. The invention also has applicability to Internet-based services such as those provided in a web-server farm or peer-to-peer computing where parallel computing can boost the performance of a job.

BACKGROUND OF THE INVENTION

The scheduling of parallel jobs has long been an active area of research. It is a challenging problem because the performance and applicability of parallel scheduling algorithms is highly dependent upon factors at different levels: the workload, the parallel programming language, the operating system (OS), and the machine architecture. The importance of job scheduling strategies stems from the impact that they can have on the resource utilization and the response time of the system.

Time-sharing scheduling algorithms are particularly attractive because they can provide good response time without migration or predictions on the execution time of the parallel jobs. However, time-sharing has the drawback that communicating processes must be scheduled simultaneously to achieve good performance. With respect to performance, this is a critical problem because the software communication overhead and the scheduling overhead to wake up a sleeping process dominate the communication time on most parallel machines.

Over the years, researchers have developed parallel scheduling algorithms that can be loosely organized into three main classes, according to the degree of coordination between processors: gang scheduling (GS), local scheduling (LS) and implicit or dynamic coscheduling (DCS).

On the one end of the spectrum, GS ensures that constructing a static global list of the order in which jobs should be scheduled coordinates the scheduling of communicating jobs. A simultaneous context-switch is then required across all processors. Unfortunately, these straightforward implementations are neither scalable nor reliable. Furthermore, GS requires that the schedule of communicating processes be precomputed, which complicates the coscheduling of client-server applications and requires pessimistic assumptions about which processes communicate with one another. Finally, explicit coscheduling of parallel jobs interacts poorly with interactive jobs and jobs performing data input and output (I/O).

At the other end of the spectrum is LS, where each processor independently schedules its processes. This is an attractive time-sharing option due to its ease of construction. However, the performance of fine-grained communication jobs can be orders of magnitude worse than with GS because the scheduling is not coordinated across processors.

An intermediate approach developed at UC Berkeley and MIT is DCS. With DCS, each local scheduler makes independent decisions that dynamically coordinate the scheduling actions of cooperating processes across processors. These actions are based on local events that occur naturally within communicating applications. For example, on message arrival, a processor speculatively assumes that the sender is active and will probably send more messages in the near future. The main drawbacks of dynamic coscheduling include the high overhead of generating interrupts upon message arrival and the limited vision of the status of the system that is based on speculative information. Some aspects of these limitations are addressed in with a technique called Periodic Boost. Rather than sending an interrupt for each incoming message, the kernel periodically examines the status of the network interface, thus reducing the overhead for communication-intensive workloads.

Figure 1A:
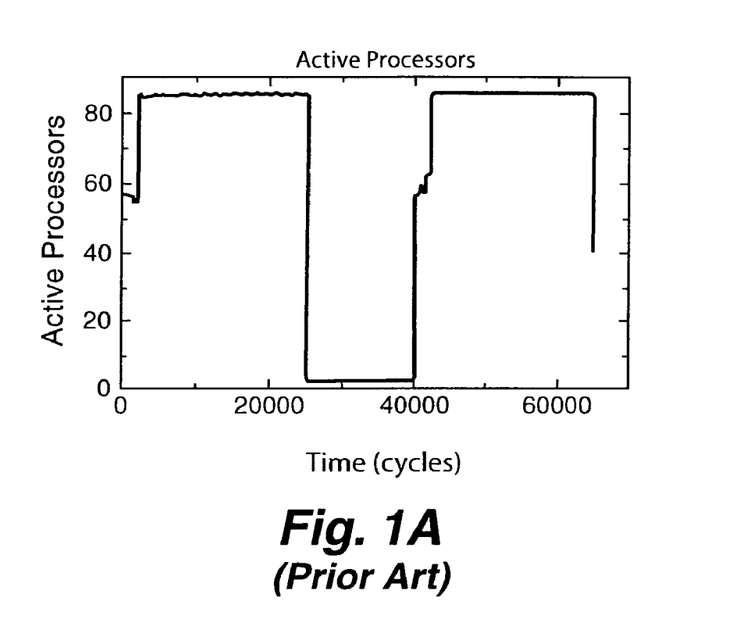
FIGS. 1A and 1B graphically depict processor and network utilization of prior art systems.
Figure 1B:
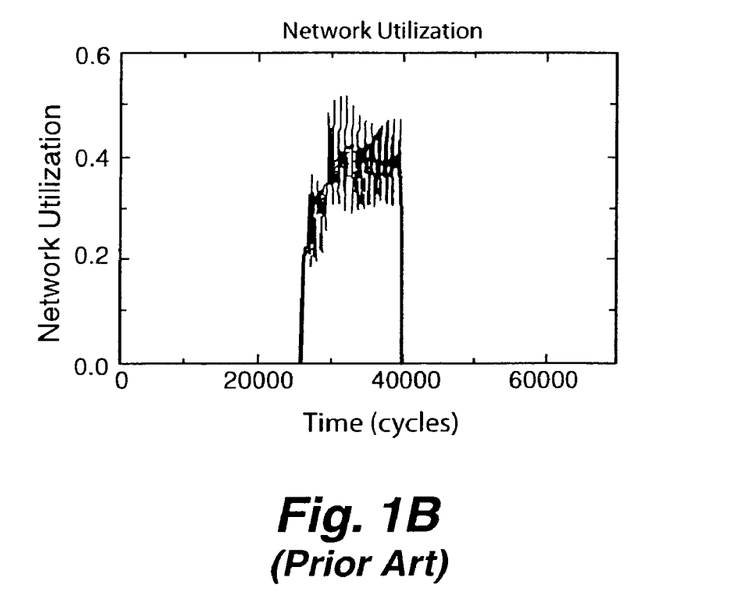
Figure 2A:
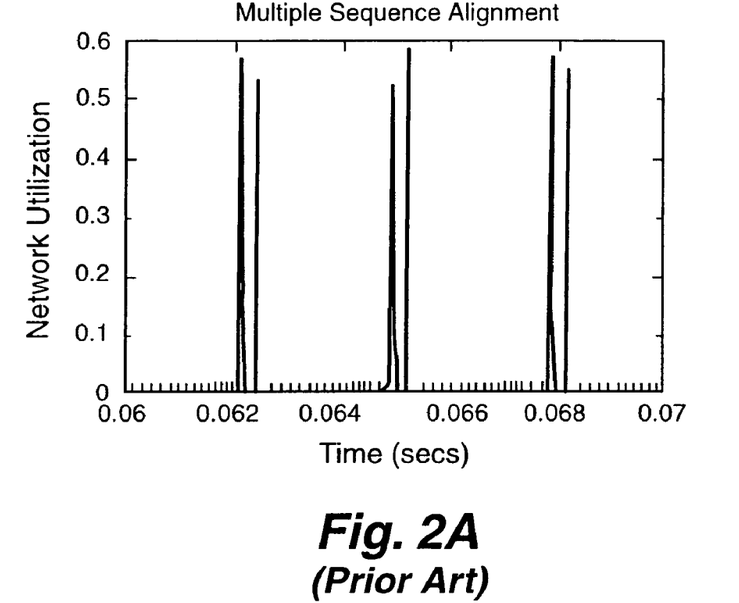
FIGS. 2A–D graphically depict network utilization in prior art scientific parallel programs.
Figure 2B:
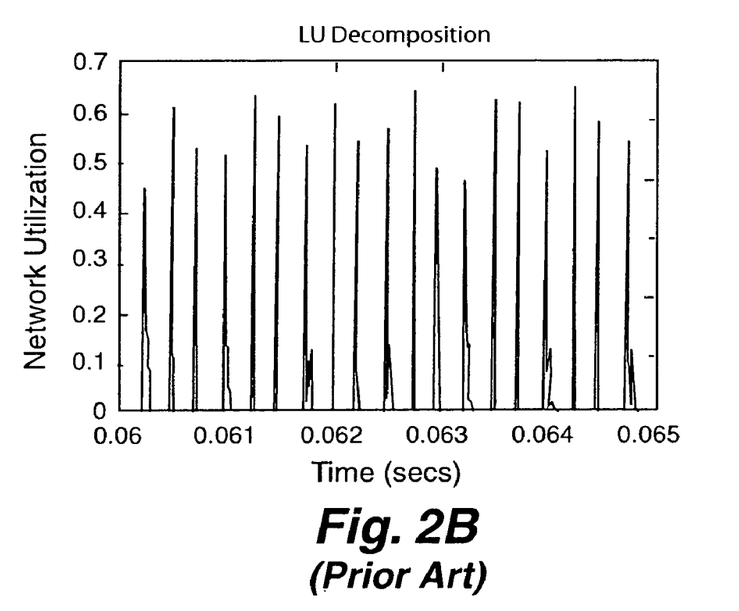
Figure 2C:
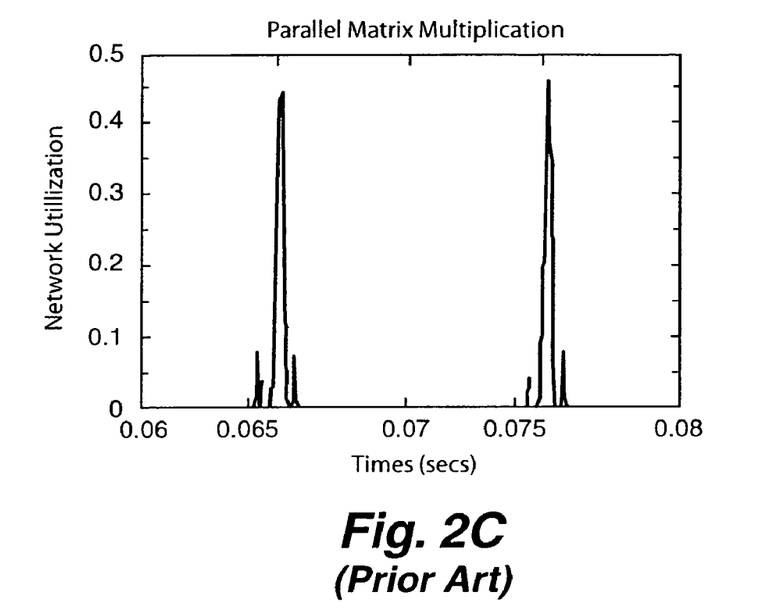
Figure 2D:
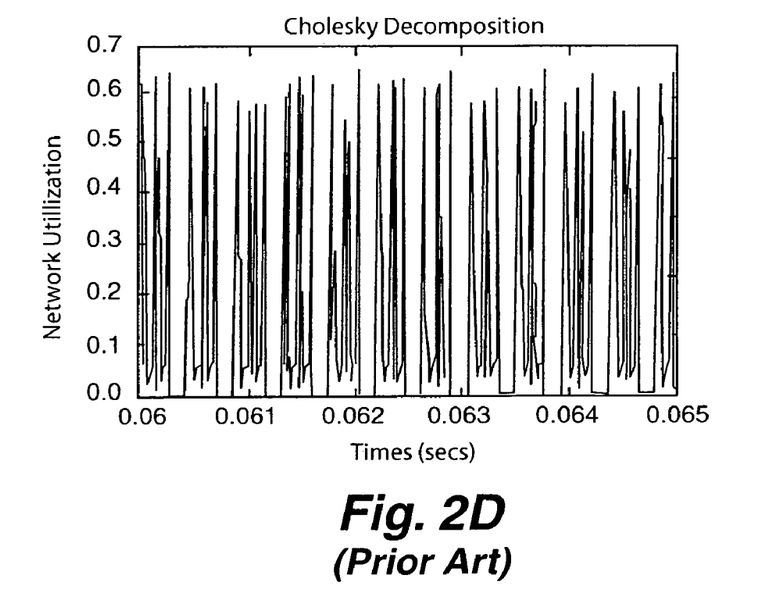

FIGS. 1A and 1B depict global processor and network utilization (i.e., the number of active processors and the fraction of active links) during the execution of a transpose FFT algorithm on a parallel machine with 256 processors. These processors are connected with an indirect interconnection network using state-of-the-art routers. Based on these figures, there is obviously an uneven and inefficient use of system resources. During the two computational phases of the transpose, the network is idle. Conversely, when the network is actively transmitting messages: the processors are not doing any useful work. Many SPMD programs, including Accelerated Strategic Computing Initiative (ASCI) application codes such as Sweep3D share these characteristics. Hence, there is tremendous potential for increasing resource utilization in a parallel machine.

Another important characteristic shared by many scientific parallel programs is their access pattern to the network. The vast majority of scientific applications display bursty communication patterns with alternating spikes of impulsive communication with periods of inactivity.

FIGS. 2A–D depict network utilization by running four distinct scientific applications over a parallel machine with 256 processors. In all four cases, there are clear communication holes, i.e., periods of network inactivity, in the network. Therefore, there exists a significant amount of communication bandwidth that can be made available for other purposes.

SUMMARY OF INVENTION

A computer implemented method schedules processor jobs on a network of parallel machine processors or distributed system processors. Control information communications generated by each process performed by each processor during a defined time interval is accumulated in buffers, where adjacent time intervals are separated by strobe intervals for a global exchange of control information. A global exchange of the control information communications at the end of each defined time interval is performed during an intervening strobe interval so that each processor is informed by all of the other processors of the number of incoming jobs to be received by each processor in a subsequent time interval.

The buffered coscheduling method of this invention also enhances the fault tolerance of a network of parallel machine processors or distributed system processors. Each processor is checkpointed at the end of a defined time interval to store a checkpointed status. System and processor faults are identified in a strobe time interval following the defined time interval. The system is reconfigured to remove any identified faults and the checkpointed status is updated with reconfigured system information. Processing is then restarted with the updated status.

BRIEF DESCRIPTION OF DRAWINGS

The accompanying drawings, which are incorporated in and form a part of the specification, illustrate embodiments of the present invention and, together with the description, serve to explain the principles of the invention. In the drawings.

DETAILED DESCRIPTION

The present invention provides a radically new approach to job multitasking, called buffered coscheduling (BCS). This new approach effectively delivers the positive aspects of GS, e.g., global coordination of jobs, along with positive aspects of DCS, e.g., increased resource utilization obtained by overlapping computation and communication of different jobs. BCS achieves these positive aspects using two novel techniques:

1. First, the communication generated by each process is buffered and performed at the end of regular time intervals (or time-slices) in order to amortize the communication and scheduling overhead. By delaying communication, the global scheduling of the communication is obtained.
2. Second, a strobing mechanism performs a global exchange of control information at the end of each time-slice in order to move from isolated scheduling algorithms [1] (where processors make decisions based solely on their local status and a limited view of the remote status) to more outward-looking or global scheduling algorithms.

The benefits of BCS include higher throughput, dramatic simplification of run-time support, reduced communication overhead, efficient global implementation of flow-control strategies and fault-tolerant protocols, and accurate performance modeling.

An important characteristic of BCS is that, instead of overlapping computation with communication and I/O within a single parallel job, all the communication and I/O that arise from a set of parallel jobs can be overlapped with the computations in those jobs. This approach represents a significant improvement over existing work reported in the literature. It allows for the implementation of a global scheduling policy, similar in function to GS but radically different in methodology, while maintaining the overlapping of computation and communication similar to DCS.

Rather than incurring communication and scheduling overhead on a per-message basis, BCS accumulates in buffers the messages generated by each process and amortizes the overhead over a set of messages. Specifically, the cost of the system calls necessary to access the kernel data structures for communication is amortized over a set of system calls rather than being incurred on each individual system call. Thus, BCS is tolerant to the potentially high latencies that can be introduced in a kernel call or in the initialization of the network interface card (NIC) that can reside on a slow I/O bus.

Figure 3:
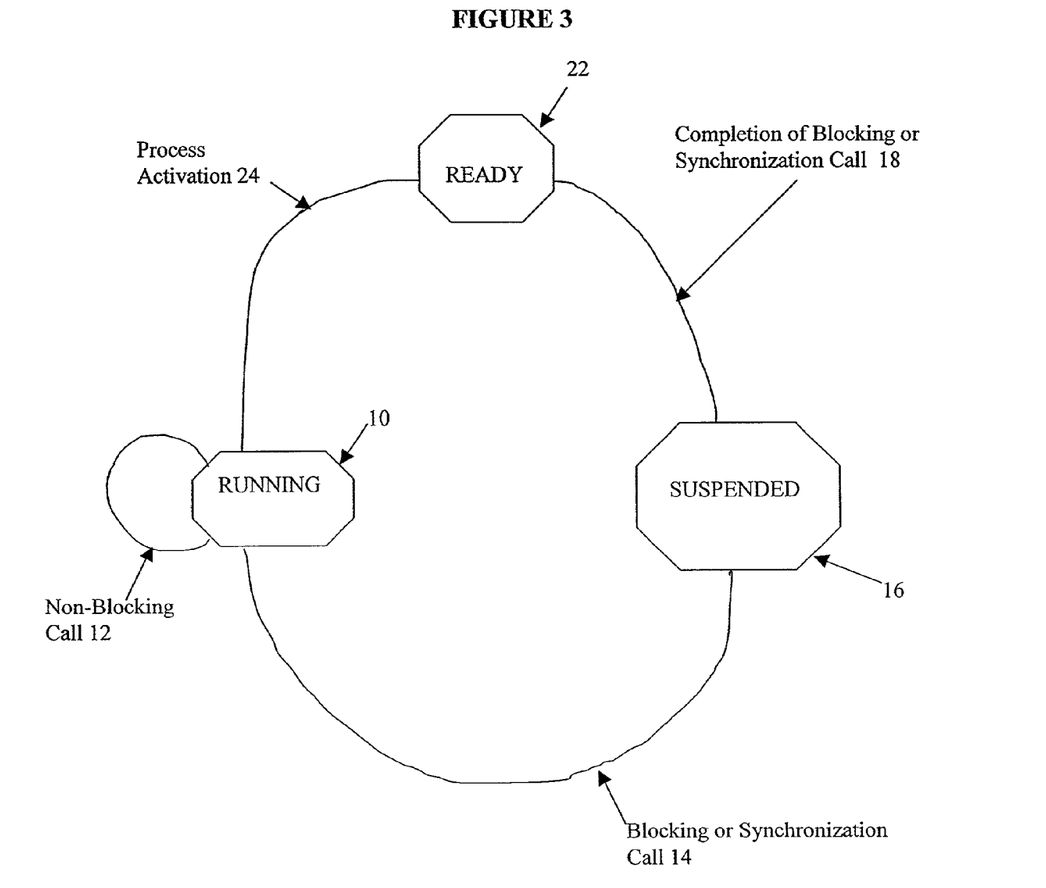
FIG. 3 schematically illustrates a state transition diagram according to the present invention.

FIG. 3 describes the state transitions of a process, with respect to communication and synchronization primitives of a process.

Figure 4:
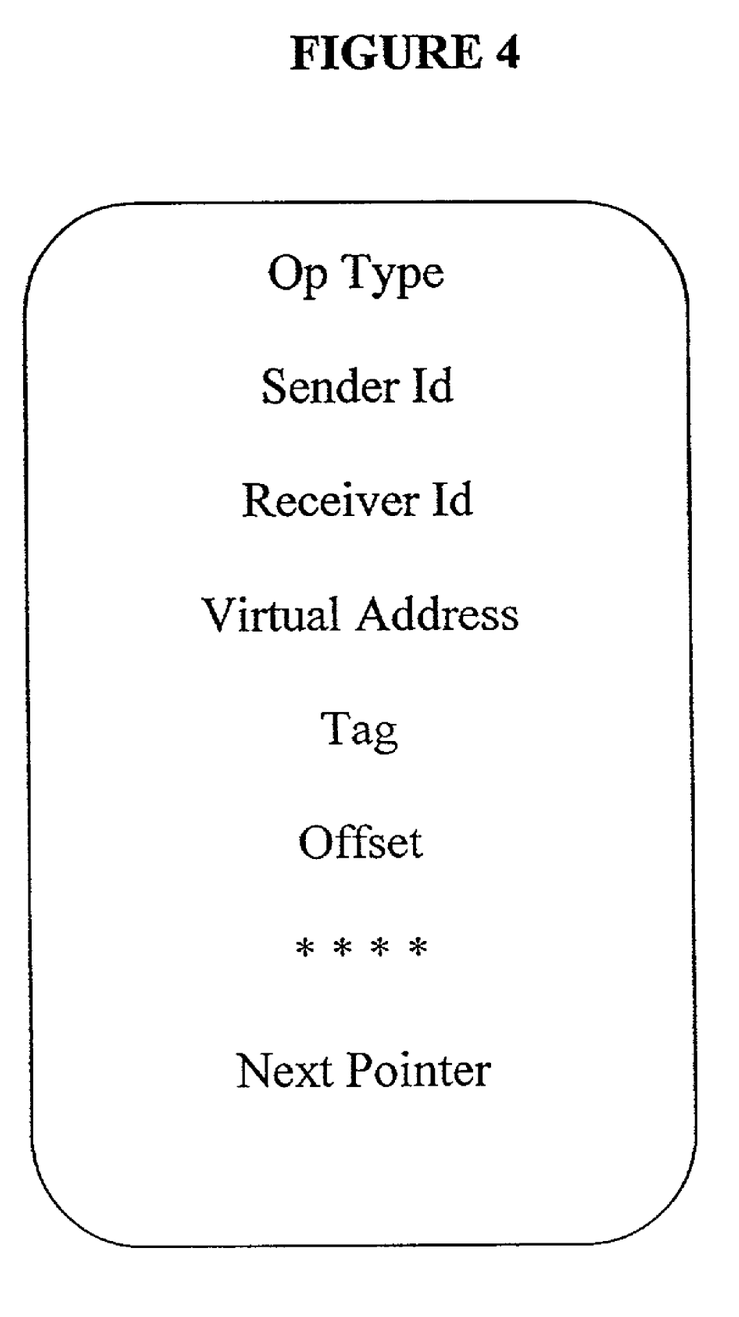
FIG. 4 illustrates a communication descriptor for transmission between processors.

1. A running process 10 keeps running in the presence of a non-blocking communication call 12 (e.g., MPI_Put or MPI_Get in MPI-2), storing the information relative to the communication primitive in a descriptor, as shown in FIG. 4.
2. With a blocking call 14, the process stores the information in the descriptor, as in the previous case and yields to the operating system. The operating system at this point suspends 16 the process and activates 24 a ready process from the ready queue 22 (if any).
3. When the communication or synchronization call is performed 18, the process is put on the ready queue 22.

At the end of each time-slice, each processor will have a collection of descriptors that describe the pending calls issued during that time-slice, as shown in FIG. 4. These descriptors identify the type of communication, the partners in the communications, the virtual addresses of the buffers, tag information, load balancing information, etc.

All the existing research in parallel job scheduling use isolated algorithms that speculatively make scheduling decisions based on a limited knowledge of the status of the machine, rather than algorithms which use non-isolated (or even global) knowledge. In order to provide the capability shown in FIG. 3, the present invention provides a strobing mechanism to support the scheduling of a set of parallel jobs that share a parallel machine. Assume, for simplicity, that each parallel job runs on an entire set of N processors, i.e., jobs are time-sharing the whole machine. The goal is to synchronize the processors of the parallel machine at the end of a time-slice in order to perform a total exchange of information regarding their status. To amortize the overhead, all the communication operations are buffered and executed at the end of the time-slice. The strobing mechanism performs an optimized total exchange of control information (which is called herein a heartbeat or strobe) and triggers the downloading of any buffered packets into the network.

At the start of the heartbeat, each processor downloads a personalized broadcast into the network. For example, referring to FIG. 5, process 1 issued three send requests and a receive request, having as communication partners, respectively, processes 32, 16,11 and 12. During the heartbeat, the processor where process 1 is mapped will send distinct control messages to the processors where processes 32,16,11 and 12 are mapped.

Figure 5:
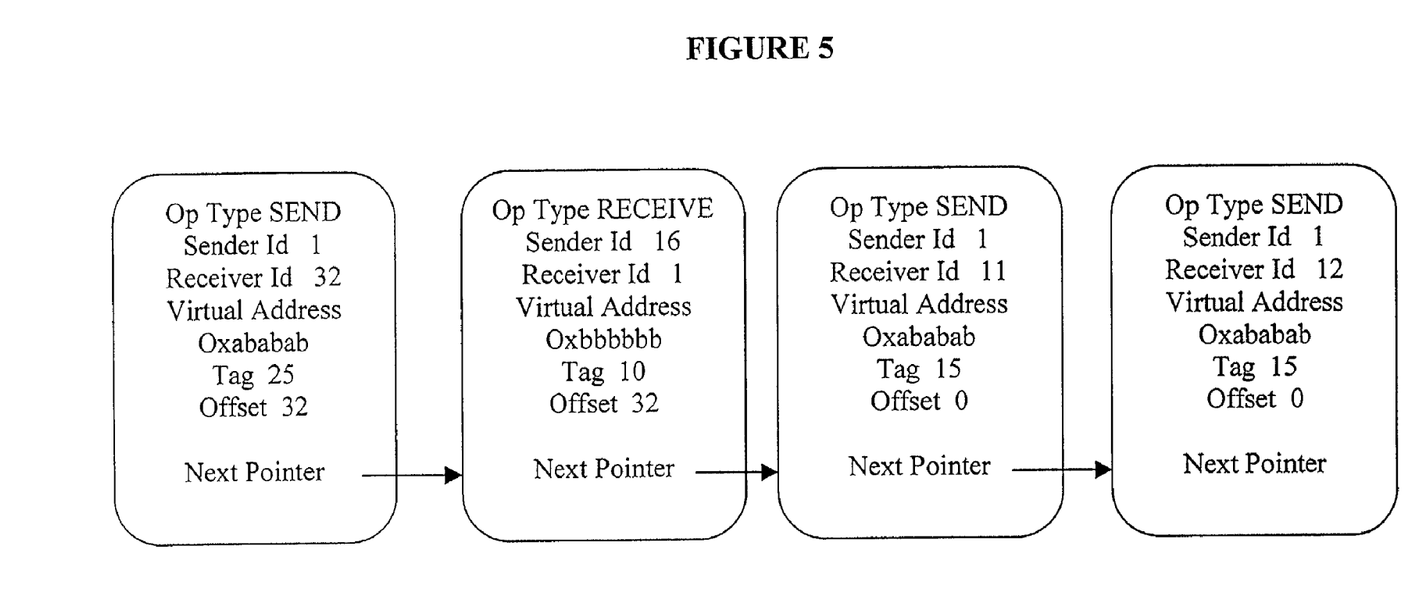
FIG. 5 illustrates a linked list of pending communication descriptors.

After downloading the broadcast, the processor continues running the currently active job. This ensures that computation is overlapped with communication. When N-1 broadcasts arrive at a processor, the processor enters a phase where its kernel downloads any buffered packets. Each broadcast contains information on which processes have packets ready for download and which processes are asleep waiting to upload a packet from a particular processor. This information is characterized on a per-process basis, so that on reception of the heartbeat, every processor will know which processes have data heading for them, and which processes on that processor they are from.

Figure 6:
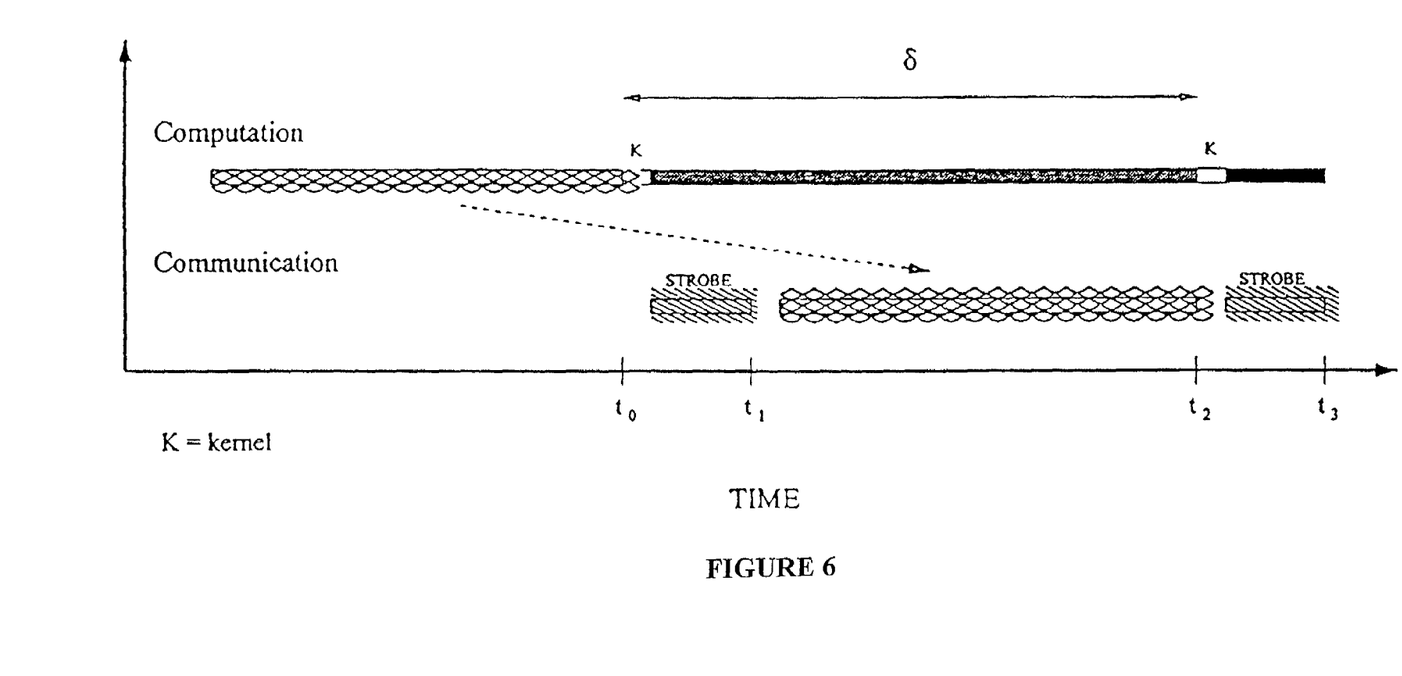
FIG. 6 illustrates computation and communication scheduling according to the present invention.

FIG. 6 shows how computation and communication can be scheduled over a generic processor. At the beginning of the heartbeat, to, the kernel downloads control packets into the network for a total exchange. During the execution of the heartbeat, another user process gains control of the processor and, at the end of the heartbeat, the kernel schedules the pending communication, accumulated in the previous time-slices (before $t_0$), to be delivered in the current time-slice $[t_0, t_2]$. From the control information exchanged between $t_0$ and $t_1$, the processor will know (at $t_1$) the number of incoming packets that it is going to receive in the communication time-slice as well as the sources of the packets and will start the downloading of outgoing packets. The potentially high overhead of the strobing algorithm is simply removed from the critical path by running another process. Thus, the latency of a global exchange of information is tolerated without experiencing performance degradation.

The strobing algorithm can be optimized in a number of ways. The solution described above requires a number of steps which is linear in the number of processors. A possible optimization is the use of a hierarchical algorithm, which trades the message length with the number of steps; with this approach it is possible to execute the strobing algorithm in a logarithmic number of steps [5].

Another possible strategy is to use randomized algorithms that propagate the information only to a subset of nodes in each step, but guarantee, with high probability, that all the relevant information reaches all the processing nodes in a limited number of steps.

BCS can also enhance fault tolerance because the status of each job is frozen at the end of each time-slice. The status of a job is composed of three main components: (1) the memory image of all the processes in the job, (2) the interprocess communication that is in progress at any given time, and (3) the I/O traffic, which includes accesses to the file system.

In a generic time-slice, the communication issued during this time-slice is buffered, so its status is composed by the communication descriptors only. The communication and the I/O traffic issued in the previous time-slices are scheduled in rounds that are completed at the end of each time-slice. The computation is also halted at the end of each time-slice. Thus the distributed status of a job is simply represented by the memory image of all the processes in the job and by the descriptors that keep track of the pending communication. This status can be easily saved for later restoration, i.e., checkpointed, using an algorithm that incrementally updates the status of the job in persistent storage, e.g., keeping track of the pages that have been overwritten in the previous time-slices. The checkpoint traffic can be scheduled as a low priority I/O traffic during the strobing algorithm and overlapped with the computation of other jobs.

BCS naturally lends itself to a fault-tolerant model based on spare processing nodes. Faulty nodes can be identified during the strobing algorithm. For example those nodes that do not respond during this algorithm are likely to be faulty and can be detected in a short time by the other nodes. At this point it is possible to trigger a distributed algorithm that (1) rolls back to the latest safe state, (2) identifies one or more spare nodes, and (3) restart the computation on those nodes. Thus the parallel machine can display a self-healing capability in the presence of faults.

FIGS. 7–10 more particularly present flow diagrams illustrating one embodiment of the buffered coscheduling of the present invention for use with parallel programming and enhanced fault tolerance.

Figure 7:
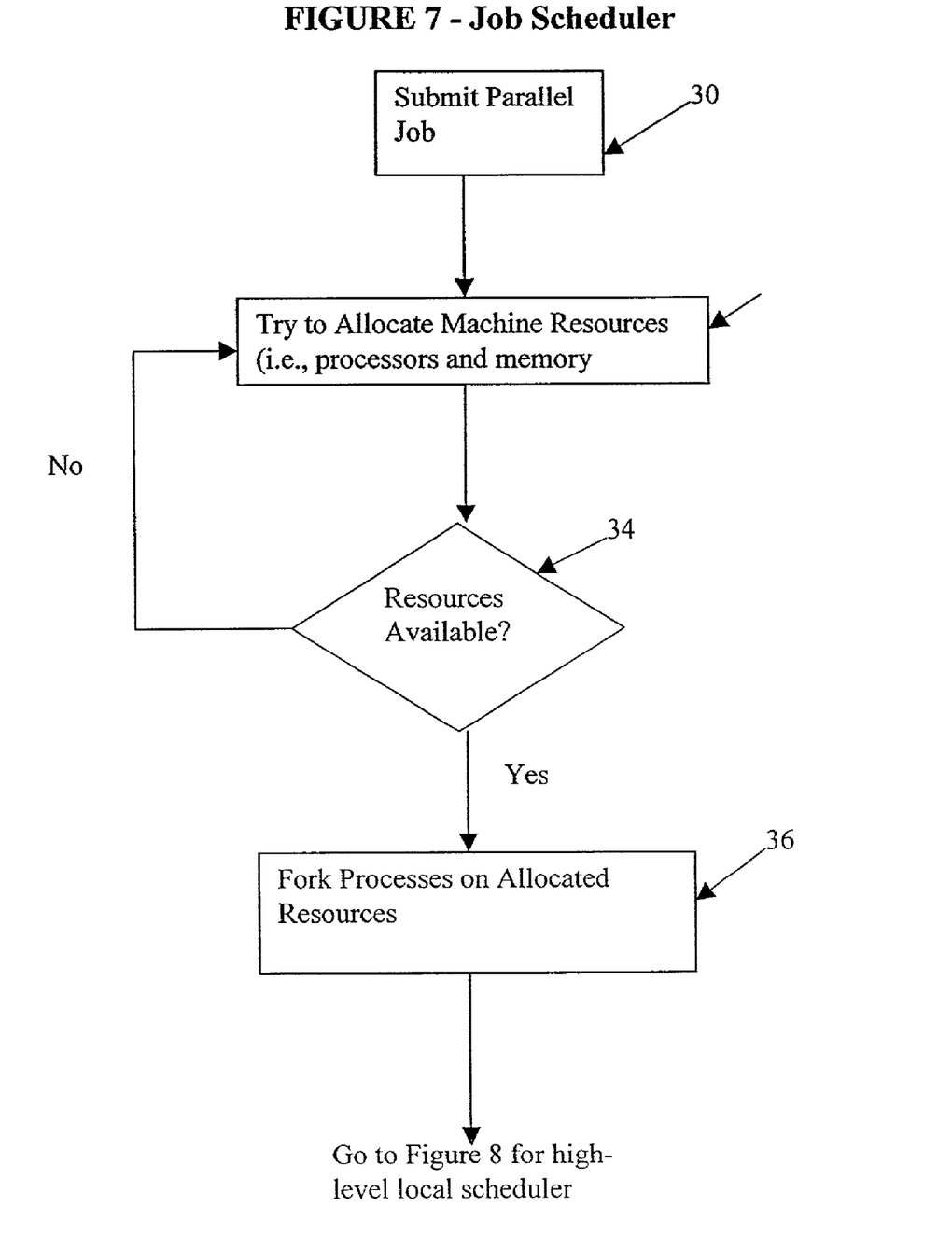
FIG. 7 is a flow diagram that depicts job scheduling according to one embodiment of the present invention.

Referring first to FIG. 7, a flow diagram illustrates how a job is scheduled on a parallel machine. The job is first submitted 30 to the resource manager, which tries 32 to allocate the resources needed by the job. The list of resources includes the number of processors and may also include memory requirements and real-time constraints. The availability of resources is then determined 34. If resources are not available, the resource manager continues to try 32 to allocate resources. Once all the resources are successfully allocated to the job, the processes are forked 36, i.e., distributed, on the requested number of processors and put in the ready state.

Figure 8:
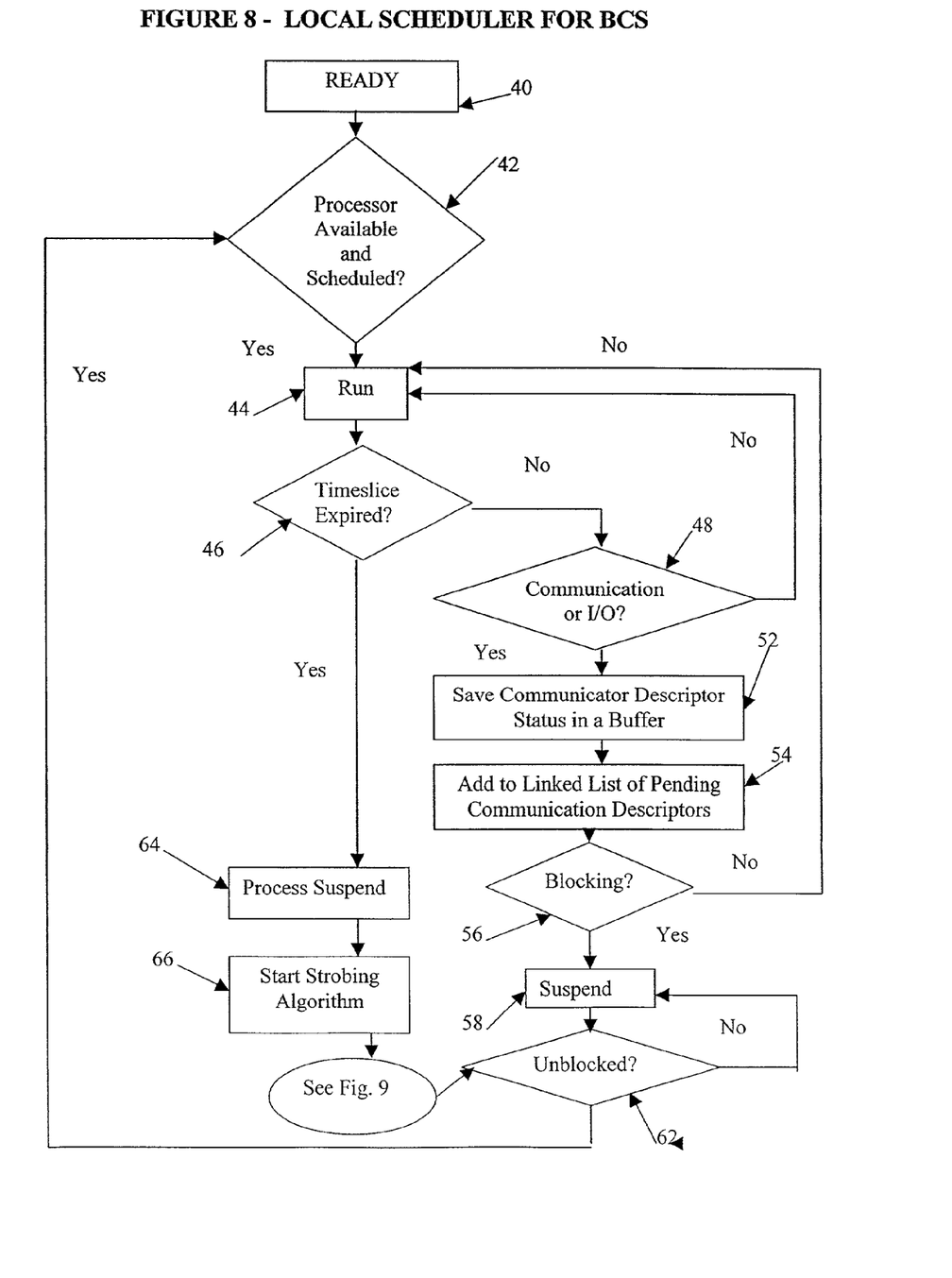
FIG. 8 is a flow diagram that depicts local scheduling for buffered coscheduling according to one embodiment of the present invention.

FIG. 8 depicts the state transitions of a process. The process is put in the ready state 40 by the resource manager (FIG. 7) when all the resources are successfully allocated. When a processor is available and scheduled 42, the process is run 44. If the time slice has not expired, the availability of communications or I/O primitives is determined 48. All the communication and I/O primitives are saved 52 in a buffer and are recorded 54 in descriptors while the process is running. The presence of blocking primitives is determined 56. In the presence of blocking primitives, the process suspends 58 running of the processor and releases the processor until the process is unblocked 62. If available, another ready process is run. When the time-slice expires, the process is suspended 64 in order to run 66 the kernel part of the strobing algorithm (FIG. 9).

Figure 9:
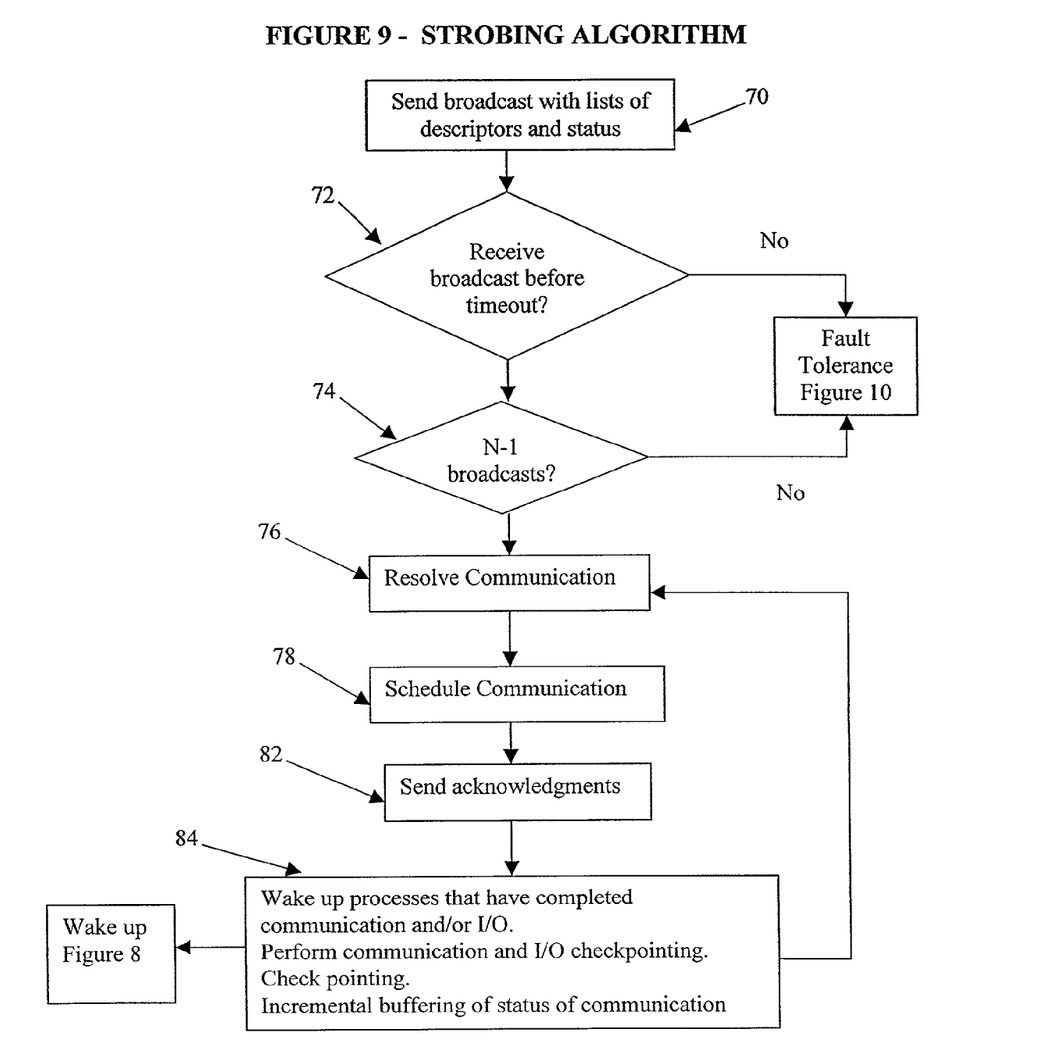
FIG. 9 is a flow diagram that depicts a strobing algorithm according to one embodiment of the present invention.

FIG. 9 illustrates the strobing algorithm in response to a broadcast 70 of descriptors and status information. In this algorithm, each processing node downloads a broadcast message containing the list of communication descriptors. If the broadcast is not received before a defined timeout (this timeout is shorter than the time-slice), the fault tolerance process (FIG. 10) is called. The node then determines 74 if a broadcast has been received from the remaining N-1 nodes. If not, the fault tolerance process is called. After receiving N-1 broadcasts, where N is the number of processing nodes, each node resolves 76 the communications by performing a pattern matching between the remote descriptors and the local descriptors. Based on that, the incoming and outgoing communication of the current time-slice is scheduled 78, and a collection of acknowledgements is sent 82 to the communication partners, which perform 84 the scheduled communication:

1) Wake up processes that have completed communication and/or IO

2) Incremental buffering of status of the communication

3) Perform checkpointing, if there is available communication bandwidth

At the end of the strobing algorithm the processing node will have an updated picture of the status of the pending communications and I/O performed in the previous time-slice. In particular, the node will know whether some pending communication has been completed. In such case, (1) it will be possible to wake up the blocked processes (FIG. 8), if any. Also, (2) it will be possible to incrementally update the descriptors that keep track of the status of the communication. For example, a large message can be sent to its destination over multiple time-slices. At the end of each time-slice the descriptors will be updated with the actual fraction of information delivered to the destination. (3) Checkpointing can be performed as a background activity, using spare communication cycles. Based on extensive performance evaluation of scientific applications it has been noted that these applications use the network in short bursts, with an overall network utilization that rarely exceeds 10%.

Figure 10:
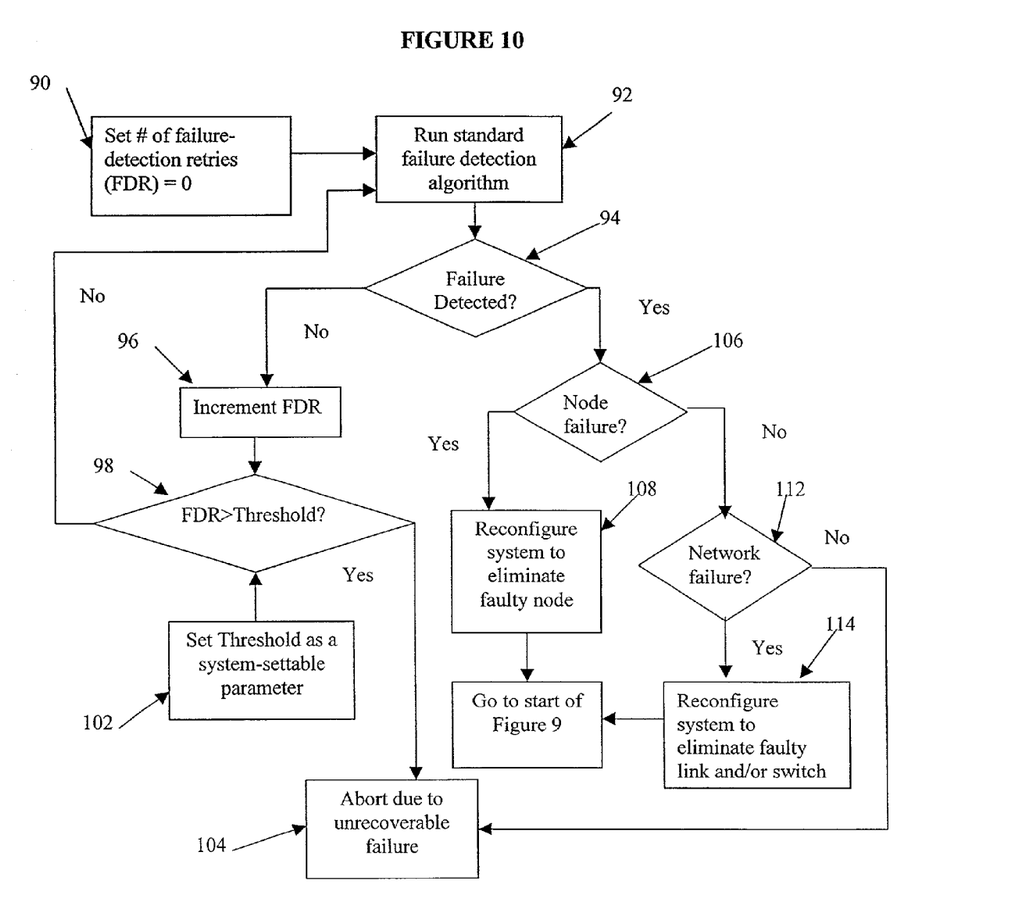
FIG. 10 is a flow diagram that depicts fault detection according to one embodiment of the present invention.

Network or node failures can be detected by using standard algorithms that probe the network or the processing nodes and reconfigure them, if necessary, as shown in FIG. 10. Because each large-scale computing system has different fault-tolerant properties, the method described here adapts to cover all varieties of large-scale computing, e.g., web-server farm, cluster farm, supercomputer. The method first begins with setting 90 the "number of failure-detection retries (FDR)" to 0 and then running 92 the system's failure-detection algorithm to determine 94 whether a failure has occurred. If a failure is not detected, FDR is incremented 96 and compared 98 to a "Threshold" value (set 102 a priori by a system administrator based on failure experiences of the system or the advertised fault tolerance of the system). If FDR is equal to or greater than the Threshold, the process is aborted 104 due to an unrecoverable failure; otherwise, the failure-detection algorithm is run again. When a failure is detected, the system tries to identify 106 the type of failure. If it is a node failure, the system re-configures 108 itself using BCS and the system software to eliminate the faulty node and resume normal execution (i.e., FIG. 9). Otherwise, a network failure is checked 112. If a network failure has occurred, then the system re-configures 114 itself using BCS and the system software to eliminate the faulty link and/or switch; then, normal execution is resumed (i.e., FIG. 9). If the failure is neither a node nor network failure, then the process is aborted 104 due to an unrecoverable failure.

There are many advantages to BCS according to the present invention. First, the communication is optimized in several ways. The cost of the system calls necessary to access the kernel data structures is amortized over a set of user calls. This implies that the methodology is tolerant to the potentially high latencies that can be introduced in a kernel call. BCS can obtain comparable performance to user-level network interfaces (e.g., the operating system by-pass protocol called ST) without using specialized hardware.

Second, the global knowledge of the communication pattern provided by the total exchange allows for the implementation of efficient flow-control strategies. For example, it is possible to avoid congestion inside the network by carefully scheduling the communication pattern and limiting the negative effects of hot spots by damping the maximum amount of information addressed to each processor during a time slice. The same information can be used at a kernel level to provide fault tolerance in the communication. For example, the knowledge of the number of incoming packets greatly simplifies the implementation of receiver-initiated recovery protocols. By globally scheduling a communication pattern, it is also possible to obtain an accurate estimate of the communication time with simple analytical models.

By knowing the maximum amount of information that can be delivered in a time-slice, the size of the communication buffers in each network interface can be minimized. This is a crucial problem in a massively parallel architecture. Consider, for example, a machine with 10000 processors—he approximate number of processors expected to be in Los Alamos National Laboratory's 30 TeraOps supercomputer. Given that each processor can potentially receive a message from all the remaining 9999 processors, it must reserve a proportional amount of network interface memory (typically, a few MB) for each potential partner. This is infeasible with current network technology and poses a serious limit to the efficient implementation of large scale parallel machines. For instance, Alteon/3Com Gigabit Ethernet cards only contain 8 MB. To support communication in such large-scale machines, orders of magnitude more memory would be needed.

Third, because communication is buffered and delayed to the beginning of the next time-slice, zero- (or low-, if fault tolerant communication is desired) copy communication can be implemented. Fault tolerance in general can also be enhanced by exploiting the synchronization point at the end of each time slice to incrementally take a "snapshot" of the status of the machine.

Fourth, an important advantage of time-sharing parallel jobs is a better utilization of the resources. When I/O is considered, there can be several orders of magnitude of difference between the computational gain of the parallel application and the access time of secondary storage. The usual approach of overlapping computation with I/O, for example using user-level threads, can only provide a limited return in the presence of a single parallel job. By overlapping the activities of multiple parallel jobs, most of the latency can potentially be hidden. The same argument can be applied to hide the non-uniform latencies of large clusters of SMPs. The higher latency of the inter-cluster communication can be overlapped with the execution of another parallel job.

Fifth, by time-sharing parallel jobs it is possible to obtain better response time and quality of service for critical applications. Time-slicing can be used to give good average completion times for dynamically changing workloads, while retaining fast response times for interactive jobs.

Sixth, because of the deep pipelines and wide out-of-order superscalar architectures of contemporary processors, an interrupt may need to nullify a large number of in-flight instructions [4]. Larger register files require existing system software to save and restore a substantial amount of process state. The reduction of the interrupt frequency provided by BCS can substantially improve the performance on these processors.

Seventh, BCS can also efficiently support future processor architectures, such as Simultaneous Multithreading (SMT) [2] [3], that time-share multiple processes at the hardware level.

The typical approach to developing parallel software is by using low-level programming models such as MPI. At that level, the user is exposed to a large number of details. The user must identify the form of parallelism in the application and decompose it into a set of parallel threads, partition the data set across these threads, map the threads and the data set on a parallel architecture, and define the communication and synchronization between these threads. This development process is typically specific to a particular application or class of user applications.

As a consequence, it is extremely difficult and very expensive to build software using such programming models. Because both correctness and performance can only be achieved by attention to many details, writing optimized MPI programs is a lengthy and error-prone process, and the result is often machine-dependent.

The alternative of using high level programming models, e.g., automatic parallelization of legacy Fortran codes, is not mature yet and must trade generality in the parallelization process with efficiency, making conservative choices. BCS has the potential of solving this tradeoff between high development costs and high efficiency vs. low development cost and low efficiency by tolerating several types of inefficiencies related to the parallelization process.

In a buffered coscheduled system, time-slicing a collection of bad programs (i.e., unbalanced computation or communication) will oftentimes result in the same behavior as a single well-behaved program. Therefore, programs running on a parallel machine need not be carefully balanced by the user to achieve good performance. Multiprogramming can provide opportunities for filling in the "sparse communication, computation and I/O cycles" when user programs are sparse, by merging, for example, many sparse communication patterns together to produce a denser communication pattern.

This can have a huge impact on the parallelization of existing legacy codes. Implementation of BCS can provide a dramatic reduction in the development times and costs of parallel software. Also, the proposed methodology is valid in general and is neither specific to any particular class of applications (e.g., molecular dynamics, linear solvers, simulations etc.), nor to any particular machine architecture (e.g., Cray T3E, SGI, IBM SP).

Finally BCS greatly simplifies the performance evaluation of a parallel job. With BCS the amount of work done by all processors, a metric very close to the sequential complexity of an algorithm, becomes as important as the critical path of the computation.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

REFERENCES (ALL INCORPORATED HEREIN BY REFERENCE)

1. Andrea C. Arpaci-Dusseau, David Culler, and Alan M. Mainwaring. Scheduling with Implicit Information in Distributed Systems. In *Proceedings of the 1998 ACM Sigmetrics International Conference on Measurement and Modeling of Computer Systems*, Madison, Wis., June 1998.
2. Keith Diefendorff. Compaq Chooses SMT for Alpha: Simultaneous Multithreading Exploits Instruction- and Thread-Level Parallelism. *Microprocessor Report*, 13(16), December 1999.
3. Susan J. Eggers, Henry M. Levy, and Jack L. Lo. Multithreading: A Platform for Next-Generation Processors. *IEEE Micro*, 17(5), September/October 1997.
4. Stephen W. Keckler, Andrew Chang, Whay S. Lee, Sandeep Chatterje, and William J. Dally. Concurrent Event Handling through Multithreading. *IEEE Transactions on Computers*, 48(9):903–916, September 1999.
5. Yu-Chee Tseng and Sandeep Gupta. All-to-All Personalized Communication in Wormhole-Routed Torus, *IEEE Transactions on Parallel and Distributed Systems*, 7(5), May 1996.

What is claimed is:

1. A computer implemented method for scheduling processor jobs on a network of parallel machine processors or distributed system processors, comprising the steps of:
   accumulating in buffers control information communications generated by each process performed by each processor during a defined time interval, where adjacent time intervals are separated by an intervening strobe interval for a global exchange of the control information communications; and
   performing the global exchange of the control information communications at the end of the defined time interval during the intervening strobe interval so that each processor is informed by all of the other processors of a number of incoming control information communications to be received by each processor in a subsequent time interval.

2. The computer implemented method according to claim 1, further including the steps of:
   running on each processor an ongoing process in the presence of a non-blocking communication call and storing control information relative to the non-blocking communication in a first descriptor;
   yielding the processor to an operating system in the presence of a blocking communication call and storing control information relative to the blocking communication in a second descriptor while suspending the ongoing process and activating a ready process from a ready queue, if any; and
   putting the ongoing process on the ready queue when the blocking communication call is completed.

3. The computer implemented method according to claim 1, further including the steps of:
   issuing a download command to each processor at the beginning of the intervening strobe interval;
   downloading from each processor, at a command of each processor kernel at the beginning of the intervening strobe interval, accumulated control information communications between all processors so that each processor is informed of the number and identity of incoming control information communications to be received in the subsequent time interval; and
   scheduling by each processor kernel of communications accumulated prior to the intervening strobe interval to be delivered in the subsequent time interval.

4. The computer implemented method according to claim 2, wherein each descriptor includes an identification of a type of communication, sending and receiving processors, and virtual addresses of the buffers.

5. The computer implemented method according to claim 3, wherein each descriptor includes an identification of a type of communication, sending and receiving processors, and virtual addresses of the buffers.

* * * * *